United States Patent
Chen (10) Patent No.: US 12,494,020 B2
(45) Date of Patent: Dec. 9, 2025

(54) HEAD-MOUNTED DISPLAY DEVICE, CONTROL METHOD, AND NON-TRANSITORY COMPUTER READABLE STORAGE MEDIUM FOR DISPLAYING REAL-WORLD OBJECT IN VR ENVIRONMENT

(71) Applicant: HTC Corporation, Taoyuan (TW)

(72) Inventor: Kuan-Wei Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 342 days.

(21) Appl. No.: 17/813,939

(22) Filed: Jul. 21, 2022

(65) Prior Publication Data

US 2023/0168510 A1 Jun. 1, 2023

Related U.S. Application Data (60) Provisional application No. 63/264,656, filed on Nov. 29, 2021.

(51) Int. Cl.
| | |
|---|---|
| *G06T 19/00* | (2011.01) |
| *G02B 27/01* | (2006.01) |
| *G06F 3/01* | (2006.01) |

(52) U.S. Cl.
CPC ........ *G06T 19/006* (2013.01); *G02B 27/0172* (2013.01); *G06F 3/011* (2013.01); *G02B 2027/0138* (2013.01); *G02B 2027/014* (2013.01)

(58) Field of Classification Search
None
See application file for complete search history.

(56) References Cited

U.S. PATENT DOCUMENTS

| | | | | |
|---|---|---|---|---|
| 2002/0050988 A1* | 5/2002 | Petrov | ................... | G06V 10/10 345/418 |
| 2009/0207169 A1* | 8/2009 | Wakayama | ........... | G06T 15/005 345/426 |
| 2012/0229463 A1* | 9/2012 | Yeh | ..................... | G06F 3/04812 345/422 |

(Continued)

FOREIGN PATENT DOCUMENTS

| | | |
|---|---|---|
| TW | 201530187 A | 8/2015 |
| TW | 202205851 A | 2/2022 |

OTHER PUBLICATIONS

Gaurav Chaurasia et al., "Passthrough+: Real-time Stereoscopic View Synthesis for Mobile Mixed Reality", Proc. ACM Comput. Graph. Interact. Tech., vol. 3, No. 1, Article 7, May 2020.

*Primary Examiner* — Sarah Le
(74) *Attorney, Agent, or Firm* — CKC & Partners Co., LLC (57) ABSTRACT

A head-mounted display device including a camera, a processor, and a displayer is disclosed. The camera is configured to capture a specific image of a specific object within an environment. The processor is coupled to the camera, and the processor is configured to: obtain several feature points of the specific image, and each of several feature points includes a world coordinate; generate a view coordinate according to the world coordinate of each of the plurality of feature points; and generate a projection coordinate of the environment according to the view coordinate of each of the feature points. The displayer is coupled to the processor, and the displayer is configured to display a virtual image including a transformed specific image.

15 Claims, 7 Drawing Sheets

(56) References Cited

U.S. PATENT DOCUMENTS

| 2015/0049201 A1* | 2/2015 | Liu | H04L 12/1827 |
| | | | 348/189 |
| 2016/0282619 A1* | 9/2016 | Oto | G02B 27/017 |
| 2021/0201580 A1* | 7/2021 | Sztuk | G06T 19/006 |

* cited by examiner

HEAD-MOUNTED DISPLAY DEVICE, CONTROL METHOD, AND NON-TRANSITORY COMPUTER READABLE STORAGE MEDIUM FOR DISPLAYING REAL-WORLD OBJECT IN VR ENVIRONMENT

BACKGROUND

Field of Invention

The present application relates to a head-mounted display device, a control method, and a non-transitory computer readable storage medium. More particularly, the present application relates to a head-mounted display device, a control method, and a non-transitory computer readable storage medium for displaying the real-world object in a VR (virtual reality) environment.

Description of Related Art

How to interact with real-world environment while wearing a VR device is one of the most challenging topics in VR industry. Pass-through is a well-known solution to this question, which allows user to see the real-world objects without taking off the HMD device (head-mounted display device). Almost every VR vendor supports this feature nowadays. One of the biggest challenges of Pass-through is how to make real objects be seen in virtual world as the same size (scale) as in real-world environment.

The difficulty lies in that the depth of the environment is unknown. As today, there's no efficient algorithm to compute 3D reconstruction by stereo images. Some proposed algorithms have visible distortion artifacts. The other drawback of Pass-through is that user cannot choose what they want to see. Pass-through occupies the entire scene. This limits the way user interacting with real-world environment while in VR.

SUMMARY

The disclosure provides a head-mounted display device including a camera, a processor, and a displayer is disclosed. The camera is configured to capture a specific image of a specific object within an environment. The processor is coupled to the camera, and the processor is configured to: obtain several feature points of the specific image, in which each of several feature points includes a world coordinate, generate a view coordinate according to the world coordinate of each of the feature points, and generate a projection coordinate of the environment according to the view coordinate. The displayer is coupled to the processor, and the displayer is configured to display a virtual image including a transformed specific image, in which the transformed specific image is transformed from the specific image according to the projection coordinate of each of several features.

The disclosure provides a control method, suitable for a head-mounted display device including a camera, a processor, and a displayer. The control method includes the following operations: obtaining several feature points of a specific image of a specific object within an environment by the processor; obtaining several world coordinates of several feature points by the processor; generating several view coordinates of several world coordinates of several feature points by the processor; and generating several projection coordinates of several view coordinates of the environment by the processor, for the displayer to display a virtual image including a transformed specific image, in which the transformed specific image is transformed from the specific image according to several projection coordinates.

The disclosure provides a non-transitory computer readable storage medium with a computer program to execute aforesaid control method.

It is to be understood that both the foregoing general description and the following detailed description are by examples and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
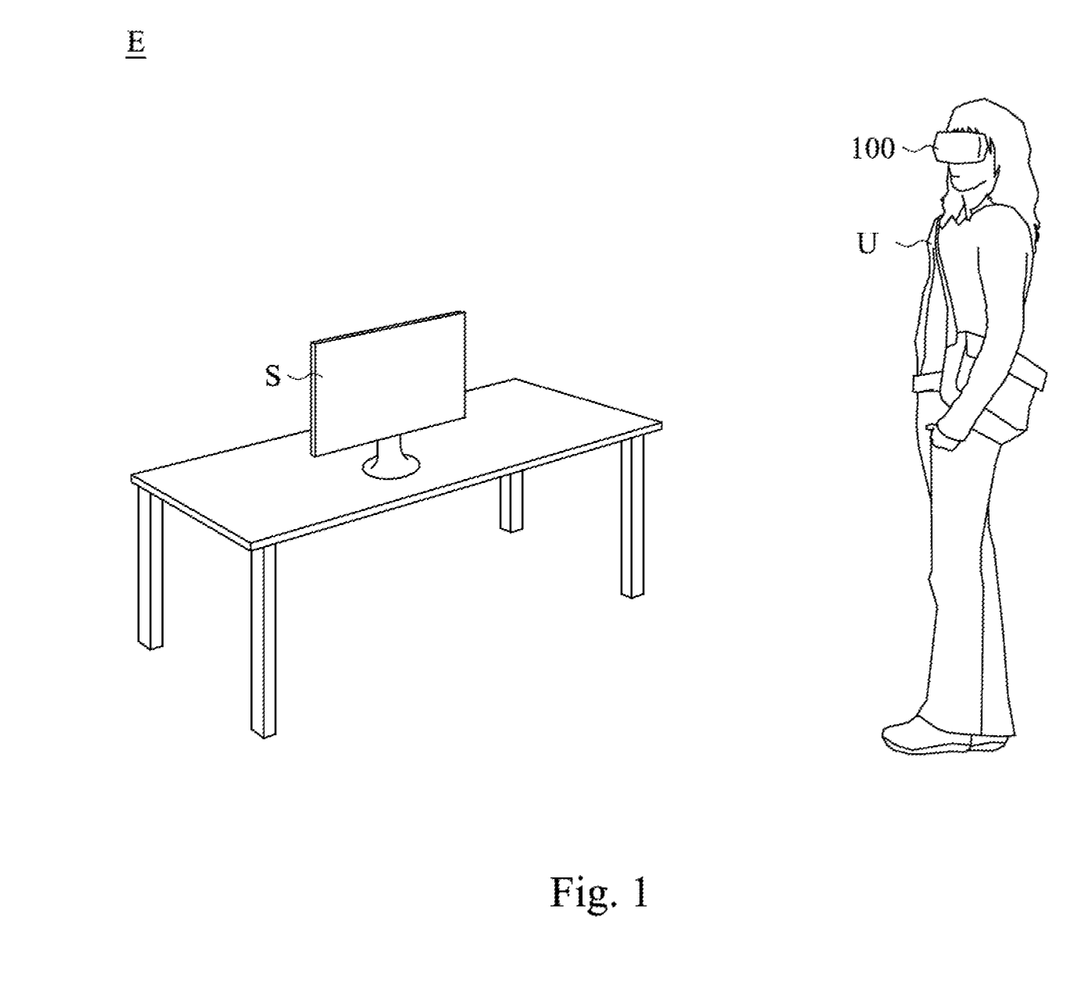
FIG. 1 is a schematic diagram illustrating an environment of a user operating a head-mounted display device of a virtual reality system according to some embodiments of the present disclosure.

Reference is made to FIG. 1. FIG. 1 is a schematic diagram illustrating an environment E of a user U operating a head-mounted display device (HMD) of a virtual reality (VR) system according to some embodiments of the present disclosure. As shown in FIG. 1, the user U is wearing a HMD device 100. The environment E is the environment where the user U operates the HMD device 100. The environment E includes a specific object S, and the specific object S is the actual object that the user U wants to interact with. In an embodiment, the system of the HMD can be operated as a mixed reality (XR) system or augmented reality (AR) system, the disclosure is not limited thereto.

In some embodiments, as shown in FIG. 1, the specific object S is a computer screen, but the embodiments of the present disclosure are not limited thereto. In some other embodiments, the specific object S may be a mouse, a controller, a phone, or any other actual objects the user U wants to interact with.

In some embodiments, the user U sets which actual object the user U wants to interact with through the VR system or the controller (not shown).

Figure 2:
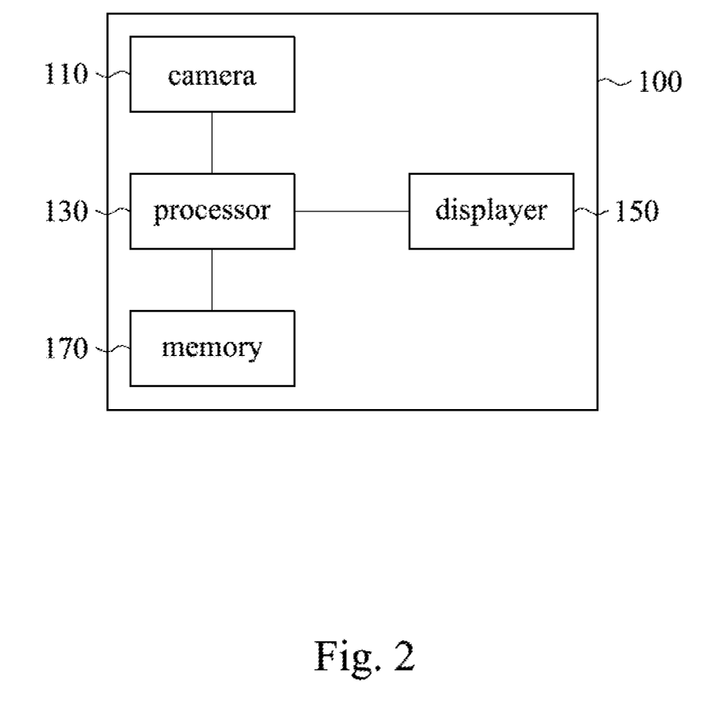
FIG. 2 is a schematic diagram illustrating a HMD device according to some embodiments of the present disclosure.

Reference is made to FIG. 2. FIG. 2 is a schematic diagram illustrating a HMD device 100 according to some embodiments of the present disclosure. As shown in FIG. 2, the HMD device 100 includes a camera 110, a processor 130, and a displayer 150. In the connection relationship, the camera 110 is coupled to the processor 130, and the displayer 150 is coupled to the processor 130.

Figure 3:
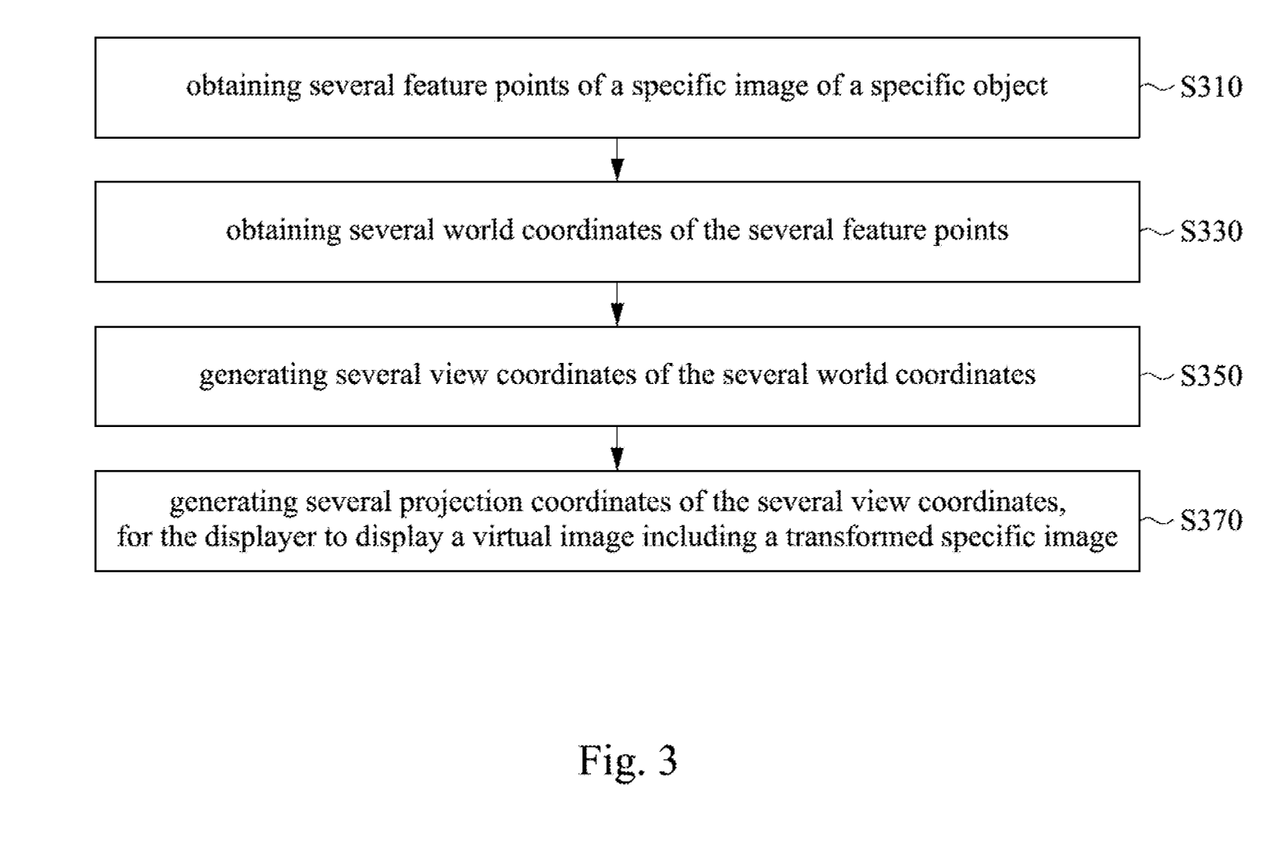
FIG. 3 is a flow chart diagram illustrating a control method according to some embodiments of the present disclosure.

Reference is made to FIG. 3. FIG. 3 is a flow chart diagram illustrating a control method 300 according to some embodiments of the present disclosure. The control method 300 is suitable to be executed by the HMD device 100 as illustrated in FIG. 2. The control method 300 includes operations S310-S370.

In operation S310, several feature points of a specific image of a specific object are obtained by the processor. In some embodiments, operation S310 is operated by the processor 130 as illustrated in FIG. 2.

Figure 4:
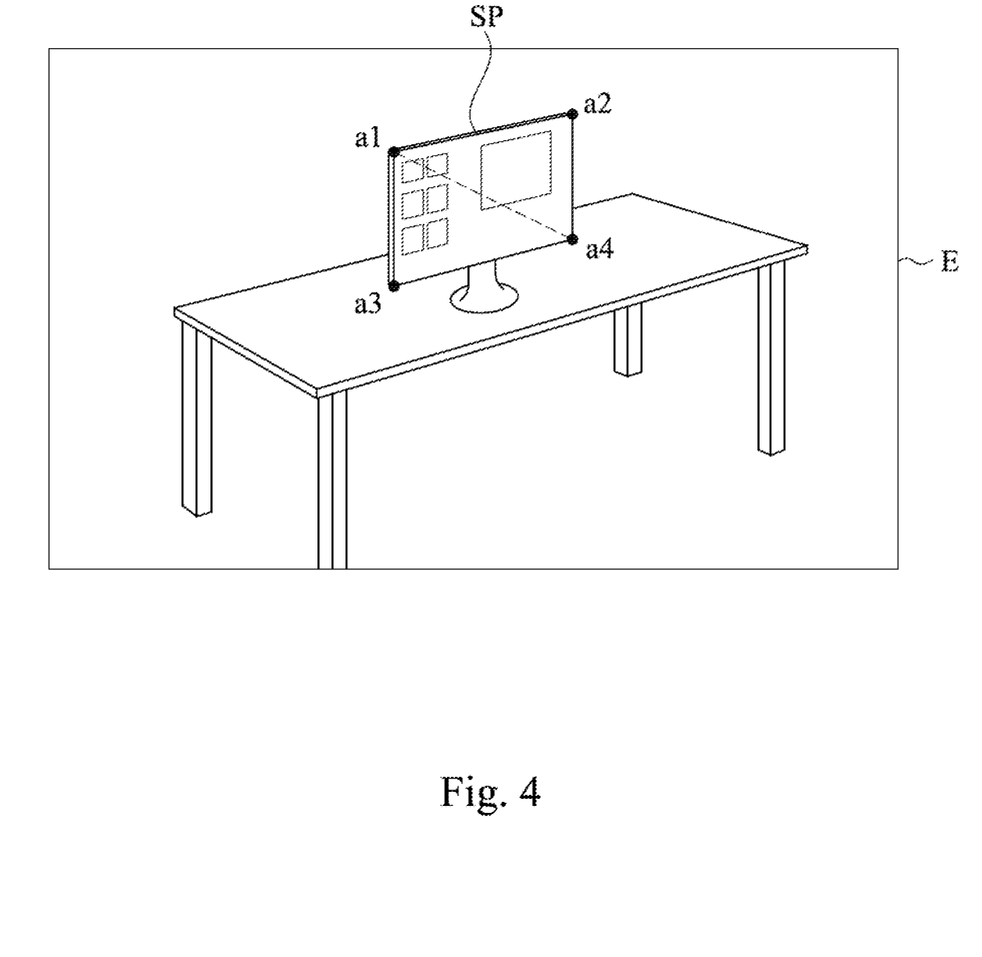
FIG. 4 is a schematic diagram illustrating a specific image within the environment as illustrated in FIG. 1 according to some embodiments of the present disclosure.

Reference is made to FIG. 4 together. FIG. 4 is a schematic diagram illustrating a specific image within the environment E as illustrated in FIG. 1 according to some embodiments of the present disclosure. In some embodiments, the camera 110 as illustrated in FIG. 2 captures the specific image SP of the specific object S within the environment E as illustrated in FIG. 1.

As illustrated in FIG. 4, due to the direction and angle between the camera 110 as illustrated in FIG. 2 and the specific object S as illustrated in FIG. 1, the shape of the specific image SP is a trapezoid instead of a rectangle.

After the camera 110 obtains the specific image SP as illustrated in FIG. 4, the processor 130 as illustrated in FIG. 2 obtains the feature points of the specific image SP.

In some embodiments, the HMD device 100 as illustrated in FIG. 2 further includes a memory 170. In the connection relationship, the memory 170 is coupled to the processor 130 as illustrated in FIG. 2. In some embodiments, the memory 170 includes a mesh module of the specific object S as illustrated in FIG. 1.

Figure 5:
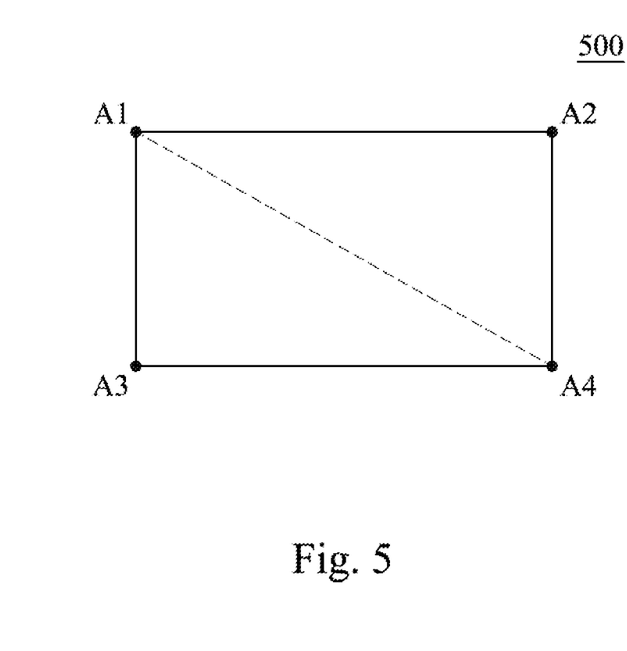
FIG. 5 is a schematic diagram illustrating a mesh module of the specific object as illustrated in FIG. 1 according to some embodiments of the present disclosure.

Reference is made to FIG. 5. FIG. 5 is a schematic diagram illustrating a mesh module 500 of the specific object S as illustrated in FIG. 1 according to some embodiments of the present disclosure. As illustrated in FIG. 5, the mesh module of the specific object S as illustrated in FIG. 1, which is a computer screen, is divided into two triangles and four feature points A1 to A4.

In some embodiments, the memory 170 stores several mesh modules of several specific objects. For example, for each of the specific objects such as a mouse, a controller, a phone, the memory 170 stores a corresponding mesh module. In some embodiments, the mesh module includes several triangles approximating the shape of the specific object.

In some embodiments, the mesh modules are previously stored in the memory 170. In some other embodiments, the mesh modules are set by the user U as illustrated in FIG. 1.

Reference is made to FIG. 4 again. As illustrated in FIG. 4, the processor 130 as illustrated in FIG. 2 obtains the feature points a1 to a4 of the specific image SP according to the mesh module 500 as illustrated in FIG. 5.

Reference is made to FIG. 3 again. In operation S330, several world coordinates of the several feature points are obtained by the processor. In some embodiments, operation S330 is operated by the processor 130 as illustrated in FIG. 2.

In some embodiments, each of the feature points a1 to a4 as illustrated in FIG. 4 includes a local coordinate of the local coordinate system of the specific object.

In some embodiments, the specific object S as illustrated in FIG. 1 includes a tracker (not shown), and the tracker sends the local coordinates of the feature points a1 to a4 to the HMD device 100 as illustrated in FIG. 2.

Figure 6:
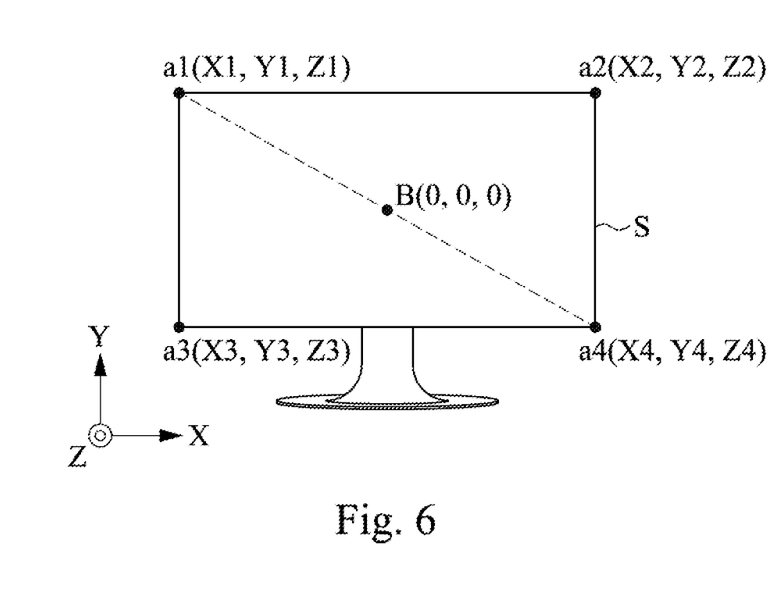
FIG. 6 is a schematic diagram illustrating the specific object as illustrated in FIG. 1 according to some embodiments of the present disclosure.

Reference is made to FIG. 6 together. FIG. 6 is a schematic diagram illustrating the specific object S as illustrated in FIG. 1 according to some embodiments of the present disclosure. For an example of the local coordinate system, an origin point B, usually the middle of the specific object S, is the origin point (0,0,0) of the local coordinate system. In a 3D space constructed by the directions X, Y, and Z, each of the feature points a1 to a4 includes a local coordinate according to the relative position and distance between the feature points a1 to a4 and the origin point B. For example, the local coordinate of the feature point a1 is (X1, Y1, Z1), the local coordinate of the feature point a2 is (X2, Y2, Z2), the local coordinate of the feature point a3 is (X3, Y3, Z3), and the local coordinate of the feature point a4 is (X4, Y4, Z4).

In some embodiments, the processor 130 as illustrated in FIG. 2 generates several world coordinates of the feature points a1 to a4 according to the local coordinates of the feature points a1 to a4. The world coordinates are generated according to a world coordinate system. In a world coordinate system, or so-called world coordinate space or global coordinate space, the world coordinates of the feature points a1 to a4 represent the relative position and distance between the feature points a1 to a4 and the origin point of the world coordinate space (not shown).

In some embodiments, the processor 130 as illustrated in FIG. 2 transforms the local coordinate into the world coordinate with a model transformation matrix $M_{model}$. Various transformation matrices between the local coordinate and the world coordinate may be applicable to the model transformation matrix $M_{model}$ of the present disclosure.

Reference is made to FIG. 3 again. In operation S350, several view coordinates of the several world coordinates are generated by the processor. In some embodiments, the several view coordinates are generated according to a user coordinate system corresponding to the user's view. In some embodiments, the operation S350 is performed by the processor 130 as illustrated in FIG. 2.

In some embodiments, the user coordinate system corresponding to the user's view, also called a viewing space, is the result of transforming the world space coordinates into coordinates in front of the field of view of the user U as illustrated in FIG. 1.

In some embodiments, the processor 130 as illustrated in FIG. 2 transforms the world coordinate into the view coordinate with a view transformation matrix $M_{view}$. Various transformation matrix between the world coordinate and the view coordinate may be applicable to the view transformation matrix $M_{view}$ of the present disclosure.

Reference is made to FIG. 3 again. In operation S370, several projection coordinates of the several view coordinates are generated by the processor, for the displayer to display a virtual image including a transformed specific image. In some embodiments, the transformed specific image is transformed from the specific image according to the projection coordinates.

In some embodiments, the operation S370 is performed by the processor 130 as illustrated in FIG. 2. In some embodiments, the camera 110 as illustrated in FIG. 2 includes a FOV parameter (field of view parameter), and the projection coordinates are generated according to the view coordinates and the FOV parameter. In some embodiments, the processor 130 transforms the view coordinates into the projection coordinate with a projection transformation matrix $M_{projection}$.

Figure 7:
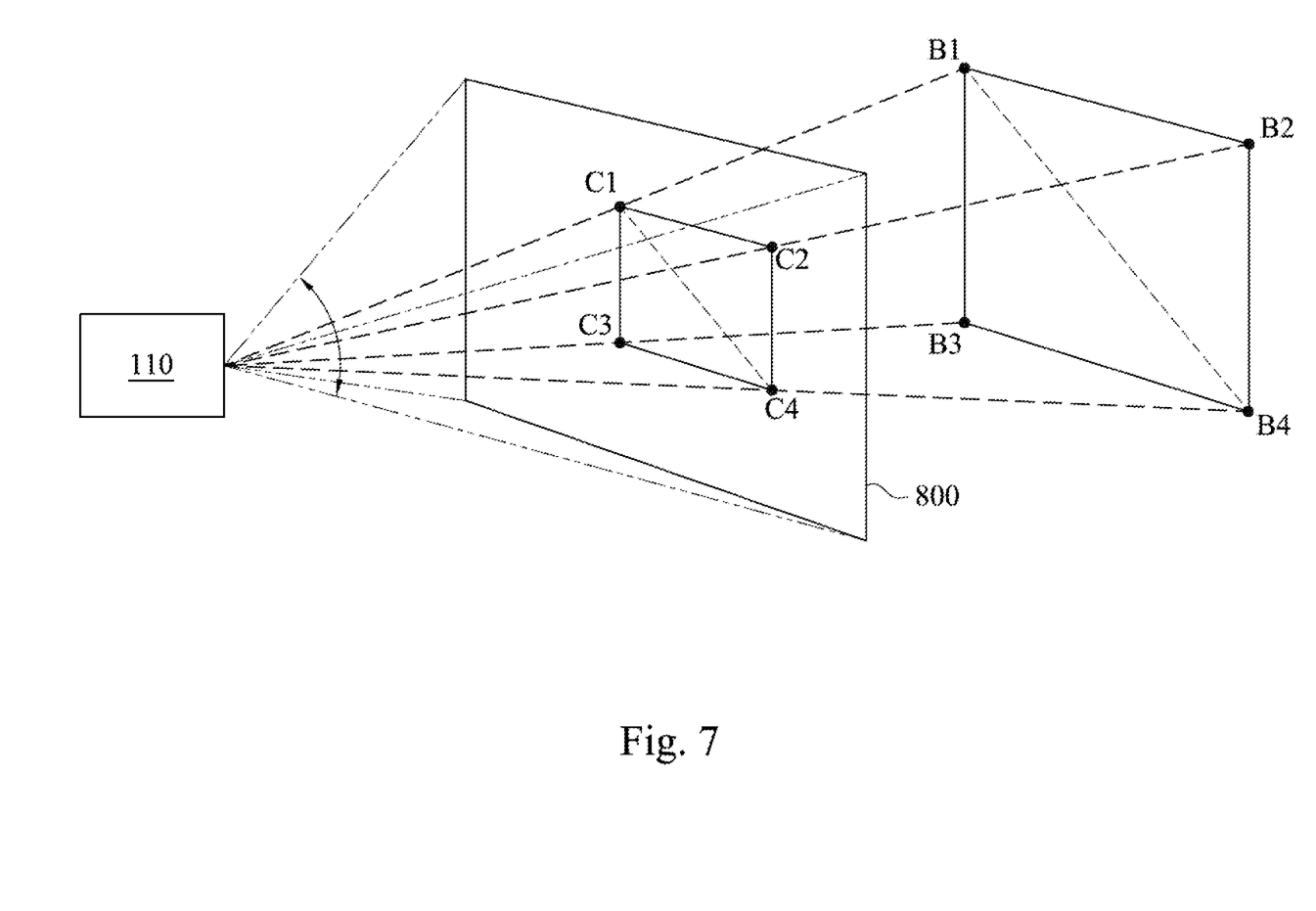
FIG. 7 is a schematic diagram illustrating a transformation from the view coordinate to the projection coordinate according to some embodiments of the present disclosure.
Figure 8:
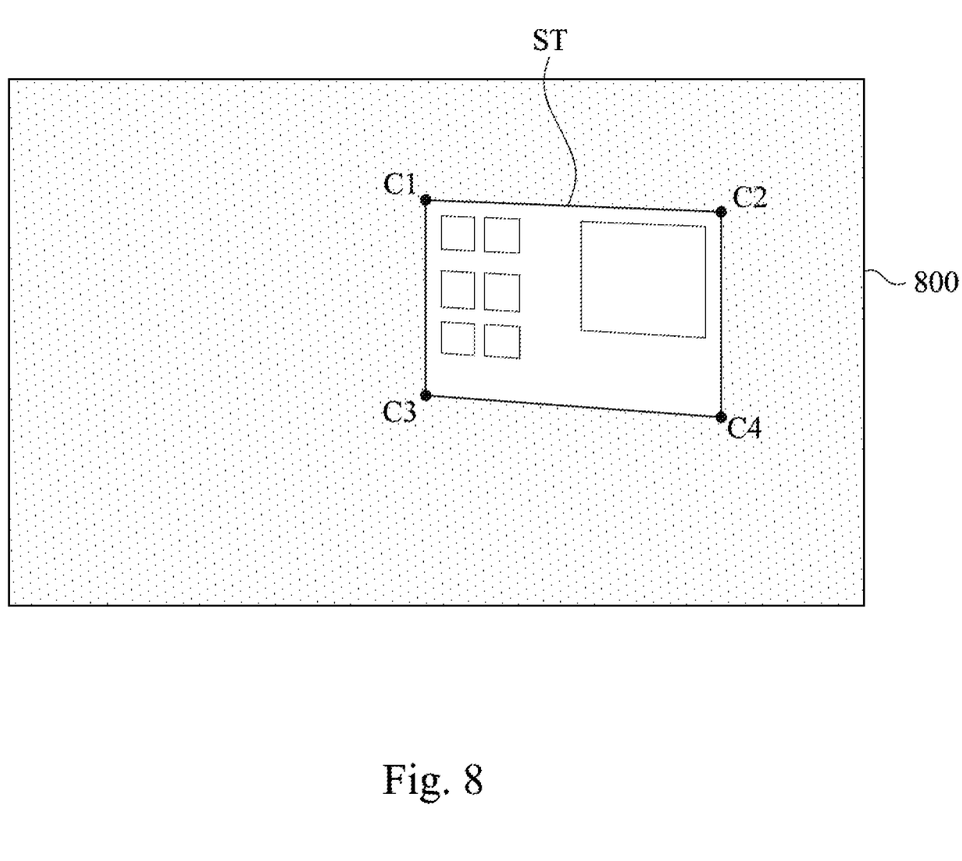
FIG. 8 is a schematic diagram illustrating a virtual image according to some embodiments of the present disclosure.

Reference is made to FIG. 7 and FIG. 8. FIG. 7 is a schematic diagram illustrating a transformation from the view coordinate to the projection coordinate according to some embodiments of the present disclosure. FIG. 8 is a schematic diagram illustrating a virtual image 800 according to some embodiments of the present disclosure. As illustrated in FIG. 7, the FOV parameter of the camera 110 determines the angle of view of the camera 110. The virtual image 800 is displayed by the displayer 150 as illustrated in FIG. 2. As illustrated in FIG. 7, the projection coordinates C1 to C4 are projection points projected from the view coordinates B1 to B4 to a user coordinate of the user U as illustrated in FIG. 1 (or the view coordinate of the camera 110, since the user U is wearing the HMD device 100 including the camera 110) on a display screen displayed by the displayer 150. It should be noted that the view coordinates B1 to B4 are virtual coordinates which does not exist in the real world.

It is shown in FIG. 7 that after projection operation, the view coordinate B1 is transformed into the projection coordinate C1, the view coordinate B2 is transformed into the projection coordinate C2, the view coordinate B3 is transformed into the projection coordinate C3, and the view coordinate B4 is transformed into the projection coordinate C4.

In some embodiments, the user coordinate of the user U is the origin point of the user coordinate system. In some embodiments, the virtual image 800 is displayed on the display screen of the displayer 150 as illustrated in FIG. 2. As illustrated in FIG. 8, the transformed specific image ST is generated according to the projection coordinates C1 to C4, and the transformed specific image ST is transformed from the specific image SP as illustrated in FIG. 4. The dashed line area is the virtual image displayed by the displayer 150 as illustrated in FIG. 2. That is, the displayer 150 displays the virtual image 800 including the transformed specific image ST.

According to the paragraph mentioned above, the projection coordinates are generated according to the following formula:

$$c = M_{projection} \times M_{view} \times M_{model} \times v, \quad \text{(formula 1)},$$

in which v is a local coordinate, $M_{model}$ transforms the local coordinate into a world coordinate, $M_{view}$ transforms the world coordinate into a view coordinate, $M_{projection}$ transforms the view coordinate into a projection coordinate, and c is the projection coordinate.

It should be noted that, the HMD device 100 as illustrated in FIG. 2 is for illustrative purposes only, and the embodiments of the present disclosure are not limited thereto. In some other embodiments, the HMD device 100 includes two or more cameras, and each cameras generates its own projection coordinates with the methods disclosed in the embodiments of the present disclosure.

In some embodiments, before generating the virtual image 800 as illustrated in FIG. 8, the processor 130 in FIG. 2 performs a render algorithm to integrate the virtual image and the transformed specific image ST so as to generate the virtual image 800.

The above-mentioned method 300 for controlling a HMD device including a camera, a processor, and a displayer can be implemented as a computer program that is stored in a computer-readable storage medium so that after the computer reads said storage medium the computer performs the method 300. The computer-readable storage medium may be a read-only memory, flash memory, floppy disk, hard disk, compact disk, USB dick, magnetic tape, a database that may be accessed via internet, or other computer-readable storage media that can easily conceived by persons having ordinary skill in the art and preform the same function. The above-mentioned control method 300 for controlling a HMD device including a camera, a processor, and a displayer can also be implemented by incorporating the computer program and one or more processors or chips.

In the embodiments of the present disclosure, the surface of the object is simplified into a large number of flat polygons, and then "polygon triangulation" is used to cut into a large number of triangles to obtain mesh of the specific object. With the mesh modules, several feature points of the endpoints of the triangles are obtained, and the local coordinates of the endpoints of the triangles are transformed into projection coordinates. The projection coordinates build up the shape of the transformed specific image. Then the processor maps the texture of the specific object on the mesh of the transformed specific image.

The embodiments of the present disclosure provide a head-mounted display device, a control method, and a non-transitory computer readable storage medium, with the mesh modules, several feature points are obtained, and the local coordinate of each feature points are transformed into projection coordinate so as to build up the shape of the transformed specific image. In the embodiments of the present disclosure, user sees actual objects they want to see, and these objects are in correct size.

In some embodiments, the processor 130 as illustrated in FIG. 2 can be, but is not limited to being, a single processor or an integration of multiple microprocessors such as CPUs or GPUs. The processor 130 is electrically coupled to the memory 170 in order to access the at least one instruction. According to the at least one instruction, the above-mentioned control method can be performed.

In some embodiments, the memory 170 as illustrated in FIG. 2 can be a flash memory, a HDD, a SSD (Solid State Disk), a DRAM (Dynamic Random Access Memory) or a SRAM (Static Random-Access Memory). In some embodiments, the memory 170 can be a non-transitory computer readable medium stored with at least one instruction associated with a control method. The at least one instruction can be accessed and executed by the processor 130.

In some embodiments, the camera 110 as illustrated in FIG. 2 can be an image capturing circuit or any other elements or circuits with the same or similar functions. In some embodiments, the displayer 150 as illustrated in FIG. 2 can be a displaying circuit displaying images or any other elements or circuits with the same or similar functions.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A head-mounted display device, comprising:
    a camera, configured to capture a specific image of a specific object within an environment;
    a processor, coupled to the camera, and configured to:
        cut the specific image into a plurality of triangles to obtain a mesh module of the specific object;
        obtain a plurality of feature points of the specific image according to a plurality of endpoints of the plurality of triangles of the mesh module, wherein each of the plurality of feature points comprises a world coordinate;
        generate a view coordinate according to the world coordinate of each of the plurality of feature points; and
        generate a projection coordinate of the environment according to the view coordinate of each of the plurality of feature points, and
    a displayer, coupled to the processor, and configured to display a virtual image comprising a transformed specific image, wherein the transformed specific image is transformed from the specific image according to the projection coordinate of each of the plurality of feature points,
    wherein each of the plurality of feature points comprises a local coordinate of a local coordinate system of the specific object, wherein the world coordinate is generated according to the local coordinate, wherein the specific object comprises a tracker, and the head-mounted display device receives the local coordinate of each of the plurality of feature points from the tracker,
    wherein an origin point of the local coordinate system is in a middle of the specific object, and the origin point is set according to the local coordinate of each of the plurality of feature points, and the origin point is a point (0,0,0) of the local coordinate system, and the origin point is not any of the endpoints of the plurality of triangles.

2. The head-mounted display device of claim 1, wherein the projection coordinate is generated according to a formula:

$$c = M_{projection} \times M_{view} \times M_{model} \times v,$$

wherein v is the local coordinate, $M_{model}$ transforms the local coordinate into the world coordinate, $M_{view}$ transforms the world coordinate into the view coordinate, $M_{projection}$ transforms the view coordinate into the projection coordinate, and c is the projection coordinate.

3. The head-mounted display device of claim 1, wherein the camera further comprises a FOV parameter (field of view parameter), and the processor is further configured to generate the projection coordinate according to the view coordinate and the FOV parameter.

4. The head-mounted display device of claim 1, wherein the processor is further configured to:
    transform the world coordinate into the view coordinate with a view transformation matrix; and
    transform the view coordinate into the projection coordinate with a projection transformation matrix.

5. The head-mounted display device of claim 1, wherein the projection coordinate is a projection point projected from the view coordinate to a user coordinate of a user on a display screen displayed by the displayer.

6. The head-mounted display device of claim 1, wherein the world coordinate is generated according to a world coordinate system, and the view coordinate is generated according to a user coordinate system.

7. A control method, suitable for a head-mounted display device comprising a camera, a processor, and a displayer, the control method comprising:
    cutting a specific image of a specific object within an environment into a plurality of triangles to obtain a mesh module of the specific object by the processor;
    obtaining a plurality of feature points of the specific image according to a plurality of endpoints of the plurality of triangles of the mesh module by the processor;
    obtaining a plurality of world coordinates of the plurality of feature points by the processor;
    generating a plurality of view coordinates of the plurality of world coordinates by the processor; and
    generating a plurality of projection coordinates of the plurality of view coordinates of the environment by the processor, for the displayer to display a virtual image comprising a transformed specific image, wherein the transformed specific image is transformed from the specific image according to the plurality of projection coordinates,
    wherein the plurality of feature points comprise a plurality of local coordinates of a local coordinate system of the specific object, the specific object comprises a tracker, and the control method further comprises:
    generating the world coordinates according to the local coordinates; and
    receiving the local coordinates of the feature points from the tracker,
    wherein an origin point of the local coordinate system is in a middle of the specific object, and the origin point is set according to the local coordinates of the feature points, and the origin point is a point (0,0,0) of the local coordinate system, and the origin point is not any of the endpoints of the plurality of triangles.

8. The control method of claim 7, further comprising:
    generating the plurality of projection coordinates according to a formula:

$$c = M_{projection} \times M_{view} \times M_{model} \times v,$$

wherein v is a first local coordinate, $M_{model}$ transforms the first local coordinate into a first world coordinate, $M_{view}$ transforms the first world coordinate into a first view coordinate, $M_{projection}$ transforms the first view coordinate into a first projection coordinate, and c is the first projection coordinate.

9. The control method of claim 7, wherein the camera further comprises a FOV parameter, and the control method further comprises:
    generating the plurality of projection coordinates according to the plurality of view coordinates and the FOV parameter.

10. The control method of claim 7, further comprising:
    transforming the plurality of world coordinates into the plurality of view coordinates with a view transformation matrix; and
    transforming the plurality of view coordinates into the plurality of projection coordinates with a projection transformation matrix.

11. The control method of claim 7, wherein the plurality of projection coordinates are a plurality of projection points projected from the plurality of view coordinates to a user coordinate of a user on a display screen displayed by the displayer.

12. The control method of claim 7, wherein the plurality of world coordinates are generated according to a world coordinate system, and the plurality of view coordinates are generated according to a user coordinate system.

13. A non-transitory computer readable storage medium with a computer program to execute a control method, the control method comprising:

cutting a specific image of a specific object within an environment into a plurality of triangles to obtain a mesh module of the specific object by a processor;

obtaining a plurality of feature points of the specific image according to a plurality of endpoints of the plurality of triangles of the mesh module by the processor;

obtaining a plurality of world coordinates of the plurality of feature points by the processor;

generating a plurality of view coordinates of the plurality of world coordinates by the processor; and generating a plurality of projection coordinates of the plurality of view coordinates of the environment by the processor, for a displayer to display a virtual image comprising a transformed specific image, wherein the transformed specific image is transformed from the specific image according to the plurality of projection coordinates, wherein the plurality of feature points comprise a plurality of local coordinates of a local coordinate system of the specific object, the specific object comprises a tracker, and the control method further comprises:

generating the world coordinates according to the local coordinates; and receiving the local coordinates of the feature points from the tracker, wherein an origin point of the local coordinate system is in a middle of the specific object, and the origin point is set according to the local coordinates of the feature points, and the origin point is a point (0,0,0) of the local coordinate system, and the origin point is not any of the endpoints of the plurality of triangles.

14. The non-transitory computer readable storage medium of claim 13, wherein the control method further comprises:

transforming the plurality of world coordinates into the plurality of view coordinates with a view transformation matrix;

transforming the plurality of view coordinates into the plurality of projection coordinates with a projection transformation matrix; and wherein the plurality of projection coordinates are a plurality of projection points projected from the plurality of view coordinates to a user coordinate of a user on a display screen displayed by the displayer.

15. The non-transitory computer readable storage medium of claim 13, wherein the plurality of world coordinates are generated according to a world coordinate system, and the plurality of view coordinates are generated according to a user coordinate system.

* * * * *